Jan. 17, 1928.
A. C. DAHL
1,656,174
BRAKING MECHANISM
Filed June 30, 1926
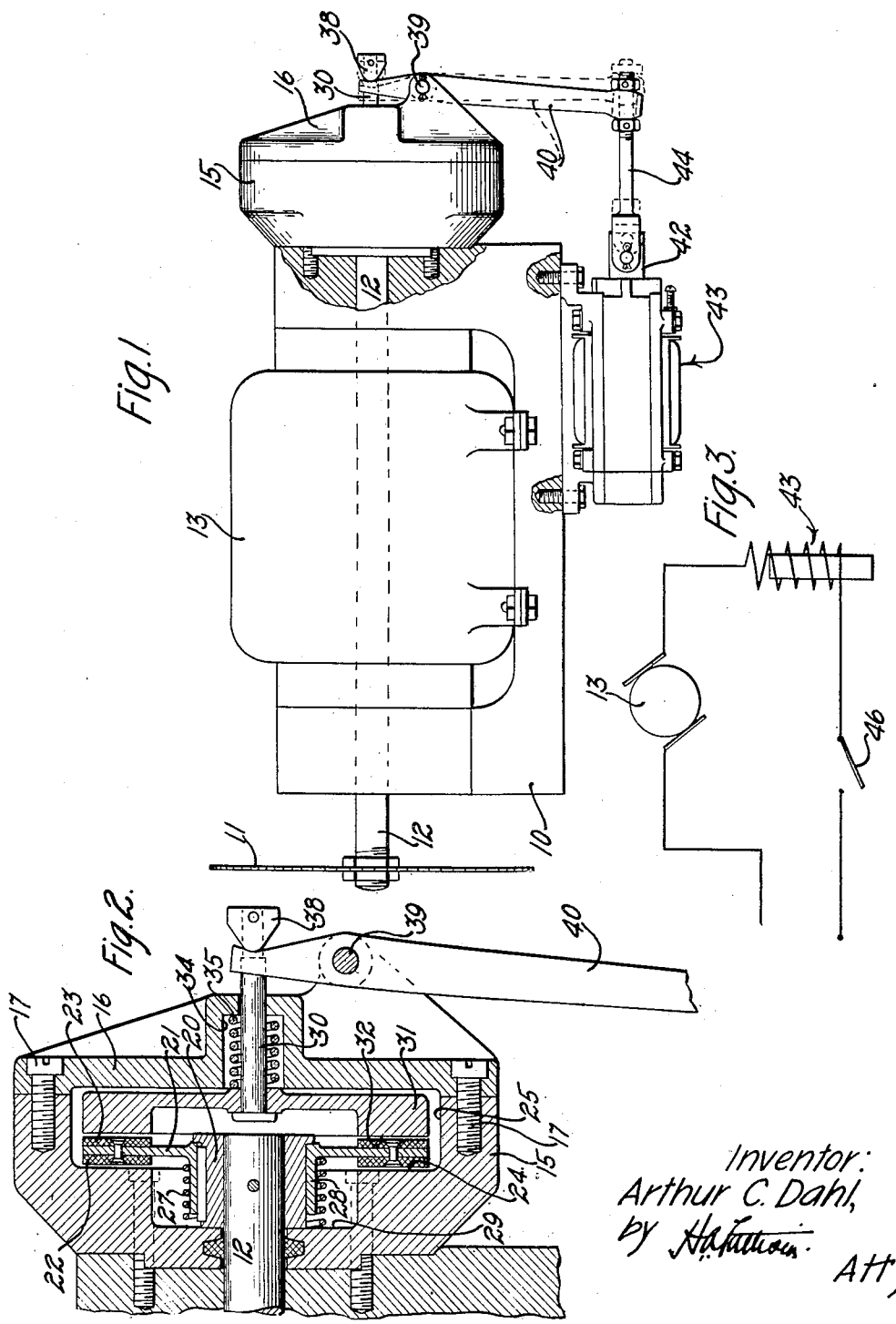
Inventor:
Arthur C. Dahl,
by H.A.Toulmin
Att'y.

Patented Jan. 17, 1928.

1,656,174

UNITED STATES PATENT OFFICE.

ARTHUR CLARENCE DAHL, OF HINSDALE, ILLINOIS, ASSIGNOR TO WESTERN ELECTRIC COMPANY, INCORPORATED, OF NEW YORK, N. Y., A CORPORATION OF NEW YORK.

BRAKING MECHANISM.

Application filed June 30, 1926. Serial No. 119,523.

This invention relates to braking mechanisms, and more particularly to an electromagnetic brake for motor driven apparatus.

In the operation of apparatus driven by electrical motors it is not only desirable but often important that the apparatus be stopped as quickly as possible upon discontinuing the supply of current to the motor. One instance of this nature occurs in the operation of high speed motor driven woodworking saws which are necessarily stopped quite frequently to change or examine the saw blades. In such instances, unless some means is provided for stopping the motor when the supply circuit is opened, it is obvious that an appreciable amount of time may be lost waiting for the apparatus to to come to a full stop. Furthermore, due to the unavoidable noises that are present in rooms or factories where apparatus of this type are usually operated, it is sometimes very difficult for the operator to ascertain when the motor or saw is at rest without approaching dangerously near the saw blade.

The principal object of the present invention is to provide an improved and simplified mechanism for quickly and effectively stopping the operation of motor driven apparatus when the motor operating power is discontinued.

In accordance with the general features of the invention there is provided in one embodiment thereof a spring actuated friction brake member adapted to normally hold the motor shaft stationary. Electromagnetic means is included in the motor supply circuit for releasing the friction brake member when the supply circuit is closed.

Other features and advantages of the invention will become apparent in the following detail description, reference being had to the accompanying drawing, wherein Fig. 1 is a plan view of a motor driven saw embodying the features of the invention, a portion of the supporting frame being omitted to more clearly illustrate the invention;

Fig. 2 is an enlarged detail section of the braking mechanism shown in Fig. 1, and Fig. 3 is a diagram of an electrical circuit suitable for operating the apparatus shown in Fig. 1.

As shown in the drawing, the numeral 10 indicates a supporting frame for a bench or table (not shown) of a motor driven saw 11. In the present embodiment of the invention, the saw 11 is rigidly secured at one end of an armature shaft 12 of an electric motor 13. The opposite end of the shaft 12 terminates in a casing 15 which houses the improved braking mechanism. The casing 15 is secured to one side of the frame 10 and is provided with a removable head 16 which is secured to the casing proper by means of bolts 17.

Secured to the end of the shaft 12 is a collar 20 to which is slidably keyed a friction disk 21 having annular friction pads 22 and 23 secured on opposite sides thereof. The friction pad 22 is positioned to engage a wall 24 of an annular recess 25 formed in the casing 15. A compression spring 27 encircling an elongated hub 28 of the friction disk 21 and interposed between the latter and a side wall 29 of the casing serves to normally disengage the friction pad 22 from the wall 24, as clearly shown in Fig. 2.

Rotatably and slidably supported in the removable head 16 and positioned in axial alignment with the shaft 12 is a stud shaft 30 upon which is loosely mounted a cup-shaped member 31 having an annular surface 32 designed to engage the friction pad 23. Disposed within an annular recess 34 formed in the head 16 is a compression spring 35 which is relatively stronger than the spring 27. As shown in Fig. 2, the spring 35 encircles the stud shaft 30 and is disposed between the member 31 and the end wall of the recess 34. It is therefore obvious that the spring 35 normally urges the member 31 towards the friction disk 21.

One end of the stud shaft 30 protrudes through the head 16 of the casing and has secured thereto a collar 38. Pivoted at 39 to the head 16 is a lever 40 which is bifurcated at one end to straddle the outwardly projecting portion of the shaft 30. The opposite end of the lever 40 is operatively connected to a plunger 42 of an electromagnetic solenoid 43 by means of an adjustable link 44 (Fig. 1). The solenoid 43 is secured to one side of the frame 10 and is connected in the motor supply circuit in such manner that it is energized when the supply circuit is closed and de-energized when the supply circuit is opened (Fig. 3).

In the operation of the above described mechanism, the motor 13 is started by closing the supply circuit in the usual manner as by means of a switch 46. This causes the solenoid 43 to become energized, whereupon it retracts its plunger 42 causing the lever 40 to turn in a clockwise direction about its pivot 39. When energized, the solenoid 43 overcomes the action of the spring 35 and the cup-shaped member 31 is thereby disengaged from the friction pad 23. Due to the action of the spring 27, the friction pad 22 is also disengaged from the wall 24 of the casing, thereby completely releasing the braking mechanism. It should be understood that this action takes place immediately upon closing the motor supply circuit to start the operation of the apparatus.

When the motor supply circuit is opened, the solenoid 43 is de-energized, and due to the action of the spring 35 the cup-shaped member 31 is engaged with the friction pad 23. Also, since the spring 35 is stronger than the spring 27, the friction disk 21 is shifted to the left, slightly, causing the engagement of the friction pad 22 with the wall 24 of the casing. In this way the motor shaft 12 is immediately subjected to a very effective brake which causes the motor to stop after a very few revolutions.

Although the invention is herein illustrated and described in connection with a motor driven saw, it should be understood that the novel features thereof are capable of other applications and that the invention should be limited only by the scope of the appended claims.

What is claimed is:

1. In a motor driven apparatus, an electrical supply circuit including a motor, a shaft driven thereby, a friction brake member slidable on and rotatable with said shaft, said brake member having friction pads secured on opposite sides thereof, a spring pressed member for actuating said brake member, and means controlled by the supply circuit for controlling the brake actuating member.

2. In a motor driven apparatus, an electrical supply circuit including a motor, a shaft driven thereby, a friction brake member slidable on and rotatable with said shaft, a coil spring concentric with said shaft for normally rendering said brake member ineffective, a second spring opposing the first spring for rendering the brake member effective, and means included in and controlled by the supply circuit for rendering the second spring ineffective when the supply circuit is closed.

3. In a motor driven apparatus, an electrical supply circuit including a motor, a shaft driven thereby, a friction brake member slidable on and rotatable with said shaft, said brake member having friction pads secured on opposite sides thereof, a coil spring concentric with the power shaft normally rendering said brake member ineffective, a spring pressed member for rendering the brake member effective, and electromagnetic means included in and controlled by the supply circuit for rendering the spring pressed member ineffective when the supply circuit is closed.

4. In a motor driven apparatus, an electrical supply circuit including a motor, a shaft driven thereby, a friction brake member slidable on and rotatable with said shaft, said brake member having friction pads secured on opposite sides thereof, a spring pressed member normally rendering said brake member effective, a pivoted arm operatively connected to said member, and means operatively connected to said arm and controlled by the supply circuit for rendering the spring pressed member ineffective.

5. In a motor driven apparatus, an electrical supply circuit including a motor, a shaft driven thereby, said shaft terminating in a stationary housing, a friction brake member slidable thereon and rotatable with said shaft, said brake member having annular friction pads secured on opposite sides thereof, a spring pressed member normally engaging one of said pads and causing the engagement of the other pad with a portion of the housing to render the brake member effective, a solenoid included in and controlled by the supply circuit for rendering the spring pressed member ineffective when the supply circuit is closed, and a spring cooperating with said solenoid for rendering the brake member ineffective.

6. In a motor driven apparatus, an electrical supply circuit including a motor, a shaft driven thereby, said shaft terminating in a stationary housing, a friction brake member having friction pads secured on opposite sides thereof, a coil spring concentric with the power shaft normally rendering the brake member ineffective, an annular non-rotatable friction member having a face adjacent one of the friction pads, a coil spring for engaging said member with one of the friction pads and causing the engagement of the other pad with a portion of the housing, a pivoted arm operatively connected to the said annular non-rotatable friction member, and means operatively connected to said arm and controlled by the electrical supply circuit for rendering the spring pressed member ineffective.

In witness whereof, I hereunto subscribe my name this 18th day of June, A. D. 1926.

ARTHUR CLARENCE DAHL.